(No Model.)

W. B. COX & J. McDONOUGH.
MOWING MACHINE.

No. 341,374. Patented May 4, 1886.

WITNESSES:
Donn Twitchell
Jno. Mathew Ritter

INVENTOR:
Walter B. Cox
John McDonough
BY Munn & Co.
ATTORNEYS.

UNITED STATES PATENT OFFICE.

WALTER B. COX AND JOHN McDONOUGH, OF NEW YORK, N. Y.

MOWING-MACHINE.

SPECIFICATION forming part of Letters Patent No. 341,374, dated May 4, 1886.

Application filed July 18, 1885. Serial No. 171,966. (No model.)

*To all whom it may concern:*

Be it known that we, WALTER B. COX and JOHN McDONOUGH, both of the city, county, and State of New York, have invented a new and Improved Mowing-Machine, of which the following is a full, clear, and exact description.

Our invention consists of a mowing-machine having a horizontally-revolving cutter arranged to act in connection with relatively stationary fingers, as hereinafter described and claimed.

Reference is to be had to the accompanying drawings, forming part of this specification, in which similar letters of reference indicate corresponding parts in both the figures.

Figure 1:
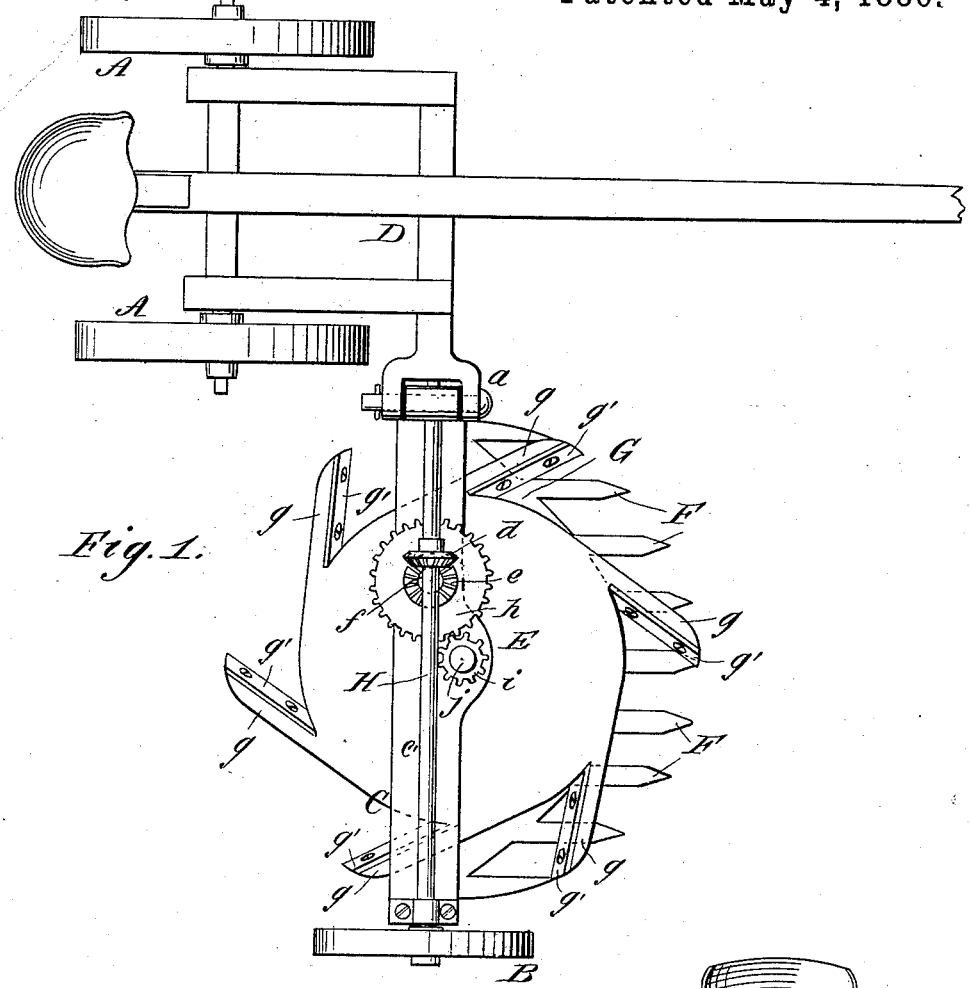
Figure 2:
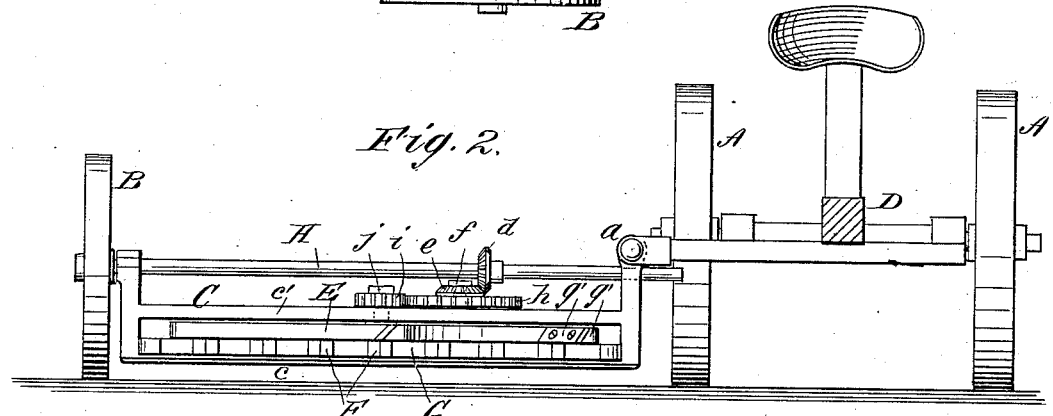

Figure 1 is a plan view of a mowing-machine made in accordance with our invention, and Fig. 2 is a front elevation of the same.

A A represent the main wheels of the machine, and B represents the drive-wheel, secured upon the shaft H at the outer end of the finger-bar C, which is attached to the main frame D of the machine by a hinge, *a*.

The cutting is performed, when the machine is drawn along the ground, by the rotary cutter E and the series of fingers F F, attached to or forming a part of the lower plate, G. The plate G and the circular rotary cutter E are held in place in this instance between the upper and lower plates, *c c'*, of the finger-bar C, and the fingers F are arranged in the arc of a circle, as shown in Fig. 1.

The cutter E is held flat upon the plate G, and is formed with the peripheral and tangential arms *g*, to which blades *g'* are attached by screws or other means, so that they may be removed for sharpening and be replaced.

The cutter E is revolved from the shaft H by the intermeshing beveled gear-wheels *d e*, secured, respectively, on the shaft H and the shaft *f*, and the intermeshing gear-wheels *h i*, secured, respectively, on the said shaft *f*, and the short vertical shaft *j*, which is journaled in the plates *c c'* of the finger-bar C, and has the cutter E secured to it between said plates *c c'*, as shown clearly in Fig. 2.

The tangential arrangement of the cutters *g'* effects a "shear" cut with the edges of the fingers F, which makes the machine easy in its action, and by arranging the fingers F in the arc of a circle the edge of the curved plate G between the teeth F serves to support the grass as the knives pass the teeth, so that none of the grass will be passed over by the machine and escape being cut.

Our invention is applicable to hand as well as horse-power machines, and to reaping as well as mowing machines.

It will be observed that the cutter-blades are secured at an angle of forty-five degrees to the inclined forward edges of the tangential arms *g*, and the opposite edges of the said blades are beveled, as shown clearly in Fig. 2, so that when a blade is dulled it may be reversed, and its sharp edge be used.

Having thus described our invention, what we claim as new, and desire to secure by Letters Patent, is—

1. In a mowing-machine, the combination of the rotary cutter E, provided with the tangential arms *g*, inclined on their forward edges, and the removable and reversible cutter-blades *g'*, secured to said inclined edges and having a beveled cutting-edge, with the relatively stationary plate G, provided with the fingers F, substantially as set forth.

2. A mowing-machine consisting of the wheels A, upon an axle, and the main frame D, supported by the axle and tongue of the machine, in combination with a lateral finger-bar hinged to the frame D, the drive-wheel B at the outer end of the finger-bar, the shaft H, rotary cutter E, fingered plate G, and the intermediate gear-wheels for revolving the cutter E, substantially as described.

WALTER B. COX.
JOHN McDONOUGH.

Witnesses:
H. A. WEST,
EDGAR TATE.